United States Patent
Hata et al.

(10) Patent No.: US 7,108,827 B1
(45) Date of Patent: Sep. 19, 2006

(54) CERAMIC SHEET AND METHOD OF PRODUCING CERAMIC SHEET

(75) Inventors: Kazuo Hata, Himeji (JP); Norikazu Aikawa, Himeji (JP); Keijirou Takasaki, Himeji (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 09/445,423

(22) PCT Filed: Apr. 6, 1999

(86) PCT No.: PCT/JP99/01833

§ 371 (c)(1),
(2), (4) Date: Dec. 10, 1999

(87) PCT Pub. No.: WO99/55639

PCT Pub. Date: Nov. 4, 1999

(30) Foreign Application Priority Data

Apr. 10, 1998 (JP) .................... 10-098631

(51) Int. Cl.
  *B32B 27/32* (2006.01)
  *B32B 18/00* (2006.01)
  *B28B 1/00* (2006.01)

(52) U.S. Cl. .............. 264/608; 264/605; 264/607; 264/671; 428/220; 428/325; 428/332; 501/1

(58) Field of Classification Search ......... 428/220, 428/209, 141, 325, 332; 156/86; 501/81, 501/103, 104, 105, 127, 1; 264/605–609, 264/618, 650, 671
See application file for complete search history.

(56) References Cited

U.S. PATENT DOCUMENTS 5,057,360 A * 10/1991 Osaka et al. ............. 428/220
5,116,663 A *  5/1992 Fujimoto et al. .......... 428/209
5,171,721 A * 12/1992 Nanataki et al. .......... 501/81
5,306,368 A *  4/1994 Yamada et al. ............ 156/86
5,955,392 A *  9/1999 Takeuchi et al. .......... 501/103
6,001,761 A * 12/1999 Hata et al. ............... 501/103

FOREIGN PATENT DOCUMENTS

| EP | 0 313 412 | 4/1989 |
| EP | 0 615 964 | 9/1994 |
| EP | 0 704 413 | 4/1996 |
| EP | 0 711 738 | 5/1996 |
| JP | 64-52680 | 2/1989 |
| JP | 2-141476 | 5/1990 |
| JP | 4-48007 | 2/1992 |
| JP | 4-160065 | 6/1992 |
| JP | 5-82348 | 11/1993 |
| JP | 8-151270 | 6/1996 |
| JP | 8-151271 | 6/1996 |
| JP | 8-151275 | 6/1996 |

OTHER PUBLICATIONS

Patent Abstracts of Japan, JP 10-291865, Nov. 4, 1998.

* cited by examiner

*Primary Examiner*—Rena Dye
*Assistant Examiner*—Lawrence Ferguson
(74) *Attorney, Agent, or Firm*—Wenderoth, Lind & Ponack, L.L.P.

(57) ABSTRACT

The present invention relates to a ceramic sheet having uniform quality over its entire surface with a decreased number of defects such as foreign matters and flaws. When the ceramic sheet was divided into sections of 30 mm square or smaller, each divided section has 5 or less defects detected based on an image obtained with a charge coupled device (CCD) camera. The present invention also relates to a method of producing the ceramic sheet. In this method, a green sheet or a calcined sheet mainly including spherical ceramic particles having an average particle diameter of 0.1 to less than 5 µm was used as a spacer. By using this spacer, the green sheet for ceramic sheet slides smoothly on the spacer surface when it shrinks in baking, and the friction resistance between the green sheet for ceramic sheet and the spacer is lowered. In this manner, the method of the present invention can mass-produce the above-described high quality ceramic sheets.

5 Claims, 2 Drawing Sheets

US 7,108,827 B1

CERAMIC SHEET AND METHOD OF PRODUCING CERAMIC SHEET

TECHNICAL FIELD

The present invention relates to a ceramic sheet having uniform quality over the entire surface thereof with a decreased number of defects such as foreign matters and flaws; and a method for producing the same.

More specifically, the ceramic sheet of the present invention has excellent properties inherent to ceramics such as high mechanical strength, thermal insulation, heat resistance, abrasion resistance, chemical resistance, corrosion resistance and electric insulation. In addition, the ceramic sheet has uniform quality over its entire surface with a decreased number of defects. For these advantages, the ceramic sheet of the present invention is suitable for use in applications including various structural members such as outer plates of heat resistant and fire resistant boards and slide members, setters used for baking, and hybrid integrated circuit boards used in the field of electronics and the like. The ceramic sheet mainly made of solid electrolyte such as stabilized zirconia has high toughness and ion conductivity for oxygen ion and the like on top of the above-described advantageous properties. In addition, the inventive ceramic sheet has a small number of defects, and therefore the above excellent properties thereof are stable. Accordingly, the above-described ceramic sheet is useful as a solid electrolyte of oxygen sensors, humidity sensors and fuel cells and the like. According to the production method of the present invention, the high quality ceramic as described above can be mass-produced.

BACKGROUND ART

In general, a ceramic sheet is produced by the following steps. Ceramic powder is mixed with an organic binder, a solvent, and if necessary, a plasticizer and a dispersant, and the resultant mixture is kneaded to produce a slurry. The slurry is formed into a green sheet by a method such as doctor blade process, calendering process and extrusion process. The green sheet is stamped or cut into a predetermined shape and baked to produce a ceramic sheet.

The ceramic sheet is excellent in mechanical strength, toughness, abrasion resistance, chemical resistance, corrosion resistance, heat resistance and electric insulation. For these advantages, the ceramic sheet is used in applications including hybrid integrated circuit boards, outer plates of heat resistant and various structural members such as fire resistant boards, and sliding members. In addition, taking advantage of its oxygen ion conductivity, the ceramic sheet is also used in applications such as solid electrolytes of oxygen sensors, humidity sensors and fuel cells and the like.

In order to use the ceramic sheet in the above-described applications, the sheet is required to have high uniformity over its entire surface with few defects such as foreign matters and flaws. The defects such as foreign matters and flaws is likely to lower the mechanical strength of the ceramic sheet and cause variations in the strength over the surface thereof. In this case, the ceramic sheet does not exhibit excellent and uniform properties over its surface. In particular, the presence of the foreign matters and flaws is a serious problem, when the ceramic sheet is used as a solid electrolyte in fuel cell in which the ceramic sheets are stacked. In the fuel cell, the ceramic sheet is kept at a high temperature of about 800 to 1000° C. under the load of at least 10 g/cm$^2$ for a long period of time. Under this condition, foreign matters and flaws in the ceramic sheet is likely to affect the Weibull modulus of the sheet, which indicates the mechanical strength and variation in mechanical strength.

The defects such as foreign matters and flaws impair not only the mechanical strength and uniformity of properties of the ceramic sheet but also the electric characteristics thereof. For example, when the ceramic sheet is a thin film having an area of 100 cm$^2$ or larger and a thickness of 0.3 mm or smaller, the thin ceramic sheet is likely to be cracked due to foreign matters and flaws, resulting in deteriorating electric characteristics thereof. In addition, the conductivity of the ceramic sheet is likely to decrease by the foreign matters in the ceramic sheet, or by a product produced by the solid phase reaction between the foreign matters and the zirconia (a main component of the ceramic sheet) due to exposure of the ceramic sheet to high temperature for a long period of time. Furthermore, the difference of thermal expansions between the zirconia and the foreign matters may cause cracks to the ceramic sheet. When the ceramic sheet is used in a fuel cell device which is sealed, the foreign matters and flaws may also cause another problem as follows. Since the periphery of the ceramic sheet is firmly fixed in the fuel cell, thermal expansion of the ceramic sheet due to exposure to high temperature may generate a stress, to cause cracks to the sheet itself. Thus, foreign matters or flaws impair the characteristics of the ceramic sheet for a solid electrolyte.

For the above reasons, the ceramic sheet is required to minimize the number of defects such as foreign matters and flaws. However, it is inevitable for the obtained ceramic sheet to have defects for the following reasons.

A green sheet contains organic components such as a solvent, a binder and a plasticizer. The organic components contain foreign matters in some cases. When the green sheet is baked, although the organic components (e.g., a solvent) themselves can decompose to be removed, the foreign matters cannot decompose, to thereby remain in the ceramic sheet as defects.

In a furnace, particles of foreign matters and dusts fly in all directions by a convective atmospheric gas. When the particles of foreign matters and dusts fall onto or adhere to the green sheet during the baking the green sheet, they remain in the resulting ceramic sheet as defects.

The contamination of foreign matters into the green sheet during baking can be suppressed to some extent by removing them in the process of forming the green sheet and cleaning the furnace. However, it is still difficult to avoid the formation of flaws for the following reasons.

At present, in order to increase the productivity of a thin ceramic sheet having an area of 100 cm$^2$ or larger and a thickness of 0.3 mm or smaller, a method such as illustrated in FIG. 1 has been studied. A cover 3a in the form of sheet containing ceramics as a main component is placed on a ceramic setter 1. On the cover 3a, green sheets to be baked (hereinafter, referred to as "a green sheet for ceramic sheet") 2 and spacers 3 in the form of sheet containing ceramics as a main component are alternately stacked. On the top green sheet for ceramic sheet 2, a thick cover 3b serving as both a cover and a weight is placed. In this state, the green sheets for ceramic sheet 2 are baked. This method is advantageous in that a number of green sheets 2 can be baked at the same time. The variations in qualities among the green sheets 2 can be suppressed by using porous sheets as the spacers 3 to release an thermally decomposed organic binder from the green sheets during dewaxing of the sheets.

This method, however, has the following disadvantage. In the baking, the green sheet 2 shrinks when the organic binder contained in the green sheet 2 decomposes to be removed from the green sheets 2 and when the ceramic powder contained in the green sheet 2 is sintered. In the method illustrated in FIG. 1 where the plurality of green sheets 2 are stacked and baked, each green sheet 2 shrinks while being scraped by the spacer 3 and/or the covers 3a, 3b in contact with the green sheet 2. The scraping forms strapes, stripe flaws, convex and concave flaws on the resulting ceramic sheet surface. In order to satisfy the demand for high productivity by employing the method of baking green sheets in a stacked state, the above defects are not avoidable. The number and size of the defects increase as the ceramic sheet has a larger area.

In an attempt to suppress the generation of defects in baking a plurality of stacked green sheets, Japanese Unexamined Patent Publication No. 4-160065 discloses a method which uses, as a spacer, a green sheet containing inorganic powder having an average particle diameter of 5 to 300 µm in a dispersed state and having a surface roughness of its one side of 10 to 200 µm.

However, in this prior art method, it is still difficult to produce a ceramic sheet having uniform quality over its entire surface with a decreased number of defects such as flaws and foreign matters, in particular, a thin ceramic sheet having an area of 100 cm$^2$ or larger and a thickness of 0.3 mm or smaller.

The present invention has been conducted to solve the above-described problems, and the objective thereof is to provide a ceramic sheet having uniform quality over its entire surface with a decreased number of defects such as foreign matters and flaws, in particular a thin and large ceramic sheet suitable as a solid electrolyte of fuel cell. The another objective of the present invention is to provide a method for producing the above-described ceramic sheets by baking a plurality of green sheets while effectively preventing the generation of defects such as flaws.

DISCLOSURE OF INVENTION

The present inventors have found that the use of a green sheet or a calcined sheet mainly including spherical ceramic particles having an average particle diameter of 0.1 to less than 5 µm as a spacer is effective in suppressing the flaws generated in the step of baking the green sheet. This is because the use of this spacer can lowers the frictional resistance between the spacer and the green sheet to be baked (hereinafter, refer to as "green sheet for ceramic sheet"). As a result, the green sheet for ceramic sheet can shrink with sliding smoothly on the spacer surface during dewaxing and/or sintering in the baking step.

According to an aspect of the present invention which has been achieved the above-described objectives, a ceramic sheet has not more than 5 defects in an area having a length of 30 mm or less. The defect is detected based on an image obtained with a charge coupled device (CCD) camera.

Preferably, the ceramic sheet includes solid electrolyte, and has an area of 100 cm$^2$ or larger and a thickness of 0.3 mm or smaller. More preferably the ceramic sheet may be a zirconia sheet including yttria.

The defect may be a flaw or foreign matter having an area of 0.1 mm$^2$ or larger.

According to another aspect of the present invention, a method for producing the ceramic sheet includes steps of sandwiching a green sheet to be baked by spacers and baking the green sheet while being sandwiched. As the spacer, used may be a green sheet or a calcined sheet including spherical ceramic particles having an average particle diameter of 0.1 to less than 5 µm as a main component.

The content of the spherical ceramic particles is preferably 80 wt % or larger with respect to the total ceramic powders contained in the spacer. The spacer preferably has a sintering temperature of 50 to 300° C. higher than the green sheet to be baked (i.e., green sheet for ceramic sheet). In addition, it is preferable that the spacer green sheet is calcined into a porous sheet having a porosity of 5 to 60% during the step of baking the green sheet for ceramic sheet to produce the ceramic sheet.

According to still another aspect of the present invention, a green sheet or a calcined sheet is used as a spacer in producing the above ceramic sheet. Preferably, the sheet includes ceramic particles 80 wt % or more of which are spherical ceramic particles having an average particle diameter of 0.1 to less than 5 µm.

BRIEF DESRIPTION OF THE DRAWINGS

BEST MODE FOR CARRYING OUT THE INVENTION

Figure 1:
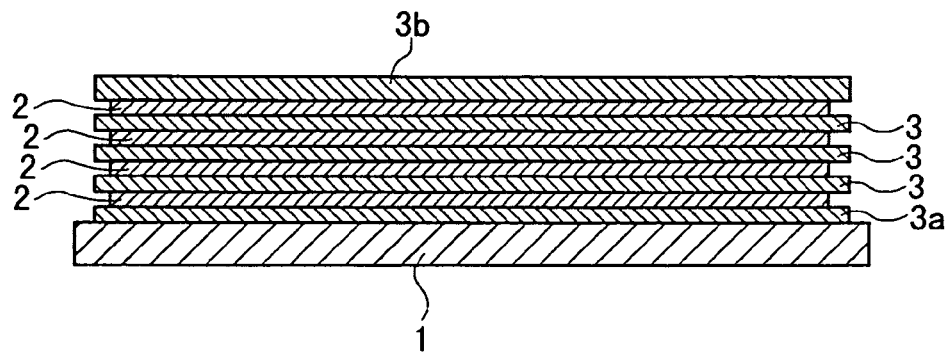
FIG. 1 is a diagram for illustrating the baking of a plurality of green sheets stacked in layers.

In the present invention, the number of defects of the ceramic sheet is counted by the following manner. The ceramic sheet is divided into 30 mm square sections or smaller. Each section is observed with a charge coupled device (CCD) camera to detect the number of defects based on the image from the CCD camera. In the observation, 5 or less defects are detected in each section. From this result, it is known that the ceramic sheet of the present invention has a decreased number of defects, and has uniform mechanical strength over its entire surface.

The CCD camera used in the present invention has 200,000 or more pixels for sensing light. The pixels convert the photoimage obtained from the light transmitting through or reflected by the objective to be observed into electric signals. The electric signals are subjected to image processing to form an image, and from the image, the strip flaws, concave flaws, pinholes, depositions and the like can be detected. In the present invention, it is preferable to use a CCD camera having 300,000 or more of pixels.

According to the present invention, the term "defect" means a foreign matter present on the surface or inside the ceramic sheet, a flaw on the surface thereof and a stain adhering to the surface thereof. The defect is not removable with water and such a solvent as ethanol, acetone and toluene. Each of the defect has an area of 0.1 cm$^2$ or larger.

The foreign matter means substances other than starting materials used for producing the green sheet. Specifically, the foreign matter may be the impurity contained in the starting materials of the green sheet, or also may be compounds which are present in the furnace and adhere to the green sheet during baking. Examples of the foreign matter may include transition metals such as iron, cobalt, nickel, copper and manganese; alkaline metals; alkaline earth metals; aluminum, silica and boron; and oxides thereof. The foreign matter has a thermal expansion different from that of the components of the ceramic sheet. Therefore, if the foreign matter is present in the ceramic sheet, the difference in thermal expansions between the foreign matter and the sheet components causes cracks to the sheet. The metals or metallic compounds, listed above as examples of the foreign matter, may be the same as the additive to the ceramic powder for producing the green sheet. However, whereas the additive has a properly adjusted average particle diameter, particle size distribution and composition, those of the foreign matters such as metals or metallic compounds are not adjusted. For this reason, the metals and the metallic compounds as the foreign matter impair the uniformity of the ceramic sheet.

As to the flaws formed on the ceramic sheet, there are various kinds and shapes, for example, line-shaped flaws formed by scratching the ceramic sheet, chain-shaped flaws, dot-shaped flaws which look as if they are formed by pricking the ceramic sheet with a needle, round-shaped flaws and pinholes.

The detection of the above-described defects is conducted by the following steps. First, the surface of the ceramic sheet is photographed with a CCD camera with the surface irradiated with a surface light or a line light. The light transmits through the defects, and the transmitted light is converted into an electric signal. Then, the electric signal is output from the CCD camera to the image processing device. In the image processing device, the electric signal is subjected to image processing to be a visually-recognizable image, and the image is displayed on an image monitor. As the surface light and the line light, a halogen lamp or a fluorescent lamp is generally used. The transmitted illumination preferably has an intensity on the surface of the ceramic sheet of 2000 to 8000 lux, and more preferably 3000 to 6000 lux.

Figure 2:
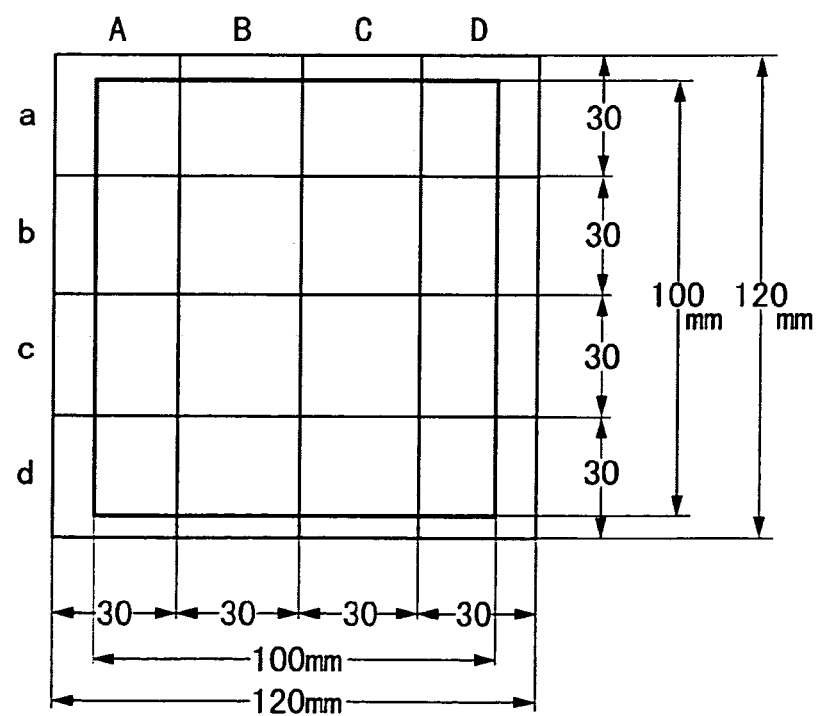
FIG. 2 is a diagram showing an embodiment of a 100 mm square ceramic sheet divided into 30 mm square sections or smaller.

In the detection of the defects, the surface of the ceramic sheet is divided into sections having a length of 30 mm or less. The dividing method is not specifically limited, and it is reasonable to divide it in such a manner that the 30 mm or less square sections are arranged in the form of chessboard. Depending on the size and shape of the ceramic sheet (for example, if the ceramic sheet has a round shape), there may have some sections smaller than 30 mm square besides 30 mm square sections. In this case, it is preferable to maximize the number of the 30 mm square sections arranged in the central area of the ceramic sheet. For example, FIG. 2 shows a preferable example of dividing a 100 mm square ceramic sheet.

All the sections in the ceramic sheet of the present invention respectively have five or less defects, regardless of how to divide the ceramic sheet. From this fact, it is found that the ceramic sheet has uniform quality over its entire surface with only a small number of defects. Due to these advantages, the ceramic sheet is preferable in the applications including sheet-like structural members for use in electrical, electronics, mechanical and chemical fields, such as sensor substrates, cutter substrates, thick-film substrates and thin-film substrates for electric circuit, radiating substrates, various other substrates, and setters used for baking. When the ceramic sheet includes solid electrolyte, it is preferably used as a solid electrolyte film of fuel cell.

The ceramics used in the ceramic sheet of the present invention is not limited to a specific kind. When the ceramic sheet is used as a solid electrolyte film, the ceramics is preferably selected from $Bi_2O_3$-type solid electrolyte, $CeO_2$-type solid electrolyte and $ZrO_2$-type solid electrolyte.

In the $Bi_2O_3$-type solid electrolyte, at least one compound selected from the group consisting of PbO, CaO, SrO, BaO, $Sm_2O_3$, $La_2O_3$, $Y_2O_3$, $Gd_2O_3$, $Er_2O_3$, $Dy_2O_3$, $Yb_2O_3$, $V_2O_5$, $Ta_2O_5$, $Nb_2O_5$, $WO_3$ and MoO is added as a stabilizer to $Bi_2O_3$, to form a solid solution. In the $CeO_2$-type solid electrolyte, at least one compound selected from the group consisting of PbO, CaO, SrO, BaO, $Sm_2O_3$, $La_2O_3$, $Y_2O_3$, $Gd_2O_3$, $Er_2O_3$, $Dy_2O_3$, $Yb_2O_3$, $V_2O_5$, $Ta_2O_5$, $Nb_2O_5$, $WO_3$ and $MoO_3$ is added as a stabilizer to $CeO_2$, to form a solid solution. In the $ZrO_2$-type solid electrolyte, at least one oxide selected from the group consisting of: oxides of alkaline earth metals such as MgO, CaO, SrO and BaO; oxides of rare earth elements such as $Y_2O_3$, $La_2O_3$, $CeO_2$, $Pr_2O_3$, $Nd_2O_3$, $Sm_2O_3$, $Eu_2O_3$, $Gd_2O_3$, $Tb_2O_3$, $Dy_2O_3$, $Er_2O_3$, $Tm_2O_3$ and $Yb_2O_3$; and $Sc_2O_3$, $Bi_2O_3$ and $In_2O_3$ is added as a stabilizer to $ZrO_2$, to form a solid solution. Besides these solid solutions, the ceramics may further contain, as an additive, oxides such as $SiO_2$, $Al_2O_3$, $Ge_2O_3$, $B_2O_3$, $SnO_2$, $Ta_2O_5$, $TiO_2$ and $Nb_2O_5$; metallic compounds such as oxides, sulfides and nitrides of Mn, Fe, Co, Ni, Cu and Zn; compounds of oxides, sulfides and nitrides of alkaline metals such as Na and K; and mixtures thereof; compound oxides thereof; and mixtures of fluorides such as $SrF_2$ and the above compounds.

When the ceramic sheet is used as a solid electrolyte film of fuel cell, powder material for the ceramic sheet preferably contains zirconia stabilized by 2 to 12 mole % of yttria, more preferably 2.8 to 10 mole %, further preferably 3 to 8 mole % and furthermore preferably 3 to 4.5 mole %. In addition, the powder material preferably has at least one additive powder selected from the group consisting of alumina, titania and silica, and the content of the additive powder is 0.01 to 5 wt % to the total weight of the powder material for the ceramic sheet. As the additive powder, alumina may be the most preferable, and its preferable content is 0.1 to 0.8 wt % to the total weight of the powder material.

The ceramic powder material for the ceramic sheet preferably has an average particle diameter of 0.1 to 0.8 μm, and a particle diameter of 2 μm or smaller at 90 vol %. More preferably, the ceramic powder has an average particle diameter of 0.1 to 0.5 μm, and a particle diameter of 1.5 μm or smaller at 90 vol %. That is, it is preferable to use ceramic powder containing a small amount of huge particles, in order to obtain a ceramic sheet having uniform quality over its surface. In the present invention, the average particle diameter and particle diameter at 90 vol % are measured by a laser light scattering method. The particle diameter at 90 vol % means a particle diameter when the cumulative volume percentage from the minimum particle diameter measured with a laser light scattering method reaches 90 vol %.

The ceramic sheet may have a square, rectangle, strap, square or rectangle having rounded corners, round or ellipse shape, but not limited thereto. The ceramic sheet may also have a hole in the shape of round, ellipse or rectangle having rounded corners.

The ceramic sheet according to the present invention is generally a rectangular sheet having a side of 25 to 300 mm or a round sheet having a diameter of 25 to 300 mm. The ceramic sheet preferably has an area of 100 $cm^2$ or larger, and more preferably 120 $cm^2$ or larger. According to the present invention, it is possible to mass produce ceramic sheets having an area of 100 $cm^2$ or larger with uniform quality over its entire surface while having only a small number of defects by baking a plurality of green sheets at a time. On the other hand, the conventional method of baking green sheets in a stacked state cannot attain such large uniform ceramic sheets.

The thickness of the ceramic sheet is not specifically limited, and in general, 0.01 to 1 mm, and preferably 0.05 to 0.5 mm, and more preferably 0.07 to 0.3 mm, and the most preferably 0.1 to 0.15 mm.

The process of forming the ceramic sheet is as follows. First, the green sheet for ceramic sheet is cut or stamped into desired shape and size. The cut green sheet for ceramic sheet is placed on a setter directly, preferably sandwiched by spacers and baked. The green sheet for ceramic sheet is produced by a conventional method. For example, ceramic powder is mixed with a solvent, binder, and plasticizer if necessary to prepare a slurry. The slurry is formed into a sheet by a method such as doctor blade process, calendering process and extrusion process. The formed slurry is then dried to evaporate the solvent therefrom, to obtain the green sheet for ceramic sheet.

Needless to say, it is necessary to prevent foreign matters and dusts from contaminating into the slurry and green sheet during preparing them. The method and conditions for baking the green sheet are not specifically limited as far as the number of defects can be suppressed to the range defined in the present invention. When stacked green sheets are baked simultaneously to produce a plurality of ceramic sheets, it is preferable that spherical ceramic particles having an average particles of 0.1 to less than 5 μm are spread over the surface of the respective green sheets for ceramic sheet so that the respective spherical ceramic particle layer intervenes between adjacent green sheets. Alternatively, it is preferable to employ the method of the present invention.

In the method of producing ceramic sheet according to the present invention, the green sheet for ceramic sheet is sandwiched by spacers and baked while being sandwiched. The spacer is a green sheet (hereinafter, referred to as "a spacer green sheet") mainly made of spherical ceramic particles having an average particle diameter of 0.1 to less than 5 μm, or a calcined sheet (hereinafter, referred to as "a spacer calcined sheet"). The spacer calcined sheet is obtained by calcining the above spacer green sheet at a temperature of lower than its sintering temperature, for example, at a 50 to 300° C. lower temperature to make the spacer calcined sheet porous. The sintering temperature means a temperature at which a green sheet is baked to have a density of 95% or greater, preferably 97% or greater and more preferably 98% or greater, with respect to the theoretical density of the sintered green sheet.

Hereinafter, the spacer of the present invention will be described.

The spacer acording to the present invention, i.e., the spacer green sheet or the spacer calcined sheet, is mainly made of ceramic particles. The most of the ceramic particles has an average particle diameter of 0.1 to less than 5 μm. Specifically, 80 wt % or more of the ceramic powders are spherical particles having an average particle diameter of 0.1 to less than 5 μm.

The reason why the spherical ceramic particles are required to have an average particle diameter of 0.1 to less than 5 μm is as follows. If the ceramic particles have an average particle diameter of less than 0.1 μm, it is hard to handle them. If the ceramic particles have an average particle diameter of 5 μm or larger, they are likely to damage the surface of the green sheet for ceramic sheet.

The spherical ceramic particles used in the present invention mean particles of which spherical shape can be visually recognized by a microphotograph. Specifically, when the ratio of its major axis to its minor axis (the major axis/the minor axis) is defined as W, the spherical ceramic particles have a W value of 1 to 3 ($1 \leq W \leq 3$), preferably 1 to 2 ($1 \leq W \leq 2$) and more preferably 1 to 1.5 ($1 \leq W \leq 1.5$).

As the spherical ceramic particles, used may be those commercially available or those obtained in a method disclosed in Japanese Unexamined Patent Publication No. 1-103904. In the method of Japanese Unexamined Patent Publication No. 1-103904, the spherical ceramic particles are obtained in the following process. An inorganic metal salt such as zirconium nitrate is hydrolyzed by urea and the like, concentrated by ultrafiltration and washed to obtain zirconia sol. To the zirconia sol, water-insoluble or water-refractory organic solvent is added in the presence of a surfactant to prepare a W/O type sol emulsion. The W/O type sol emulsion is mixed with a basic substance to gelatinize the sol to obtain spherical gel. The spherical gel is heated to remove the water contained in the gel together with organic solvent from the system, thereby producing the spherical ceramic particles.

There is no specific limitation on the composition of the spherical ceramics for the green sheet as a spacer (i.e., a spacer green sheet) and the calcined sheet as a spacer (i.e., a spacer calcined sheet; when there is no need to distinguish the spacer green sheet from the spacer calcined sheet, they are generally referred to as "a spacer sheet"), and its composition may be the same as of the ceramics used for the green sheet for ceramic sheet. Since the spacer sheet is preferably porous, it is preferred to select a ceramic composition of the spacer sheet so that the composition has a sintering temperature of 50 to 300° C. higher than the composition of the green sheet for ceramic sheet. This is because, in the case that a calcined sheet made of ceramics having higher sintering temperature than the green sheet for ceramic sheet is used as the spacer sheet, the spacer calcined sheet can keep its calcined state and porosity until the baking of the green sheet for ceramic sheet is completed. In the other case that a green sheet made of ceramics having higher sintering temperature than the green sheet for ceramic sheet is used as the spacer sheet, the spacer green sheet is calcined to be porous rather than baked in the baking step of the green sheet for ceramic sheet, and keeps its calcined state until the baking of the green sheet for ceramic sheet is completed. For example, when the spacer sheet is a green sheet mainly made of alumina as ceramics (sintering temperature: about 1600 to 1700° C.) and the green sheet for ceramic sheet is mainly made of zirconia (sintering temperature: about 1400 to 1500° C.), the spacer green sheet is calcined at a temperature of 50 to 200° C. lower than its sintering temperature during the baking of the green sheet made of zirconia for producing zirconia sheet. The spacer green sheet made of almina is calcined at any point in the baking step and serves as a calcined porous spacer sheet throughout the remaining baking step of the green sheet for ceramic sheet. The porous spacer sheet is preferable because the gas decomposed during the baking of the green sheet for ceramic sheet can easily evaporate and be removed from the green sheet for ceramic sheet through the pores of the spacer. In addition, since the porous spacer sheet has a low bulk density, it provides a low friction against the green sheet for ceramic sheet.

As is the case of producing the green sheet for ceramic sheet, the spacer green sheet may be produced by a known method such as disclosed in Japanese Unexamined Patent Publication No.

The spacer calcined sheet is obtained by calcining the spacer green sheet at a temperature of 50 to 300° C. lower than its sintering temperature. In other words, the spacer green sheet is calcined so as to have a porosity of 5 to 60%, and preferably 10 to 50% or higher.

The spacer sheet preferably has a thickness as small as possible, as far as it protects the green sheet for ceramic sheet from being influenced by the surface shape of the setter. In general, the spacer sheet has a thickness in the range of ±200% (sic +200%) of the thickness of the green sheet for ceramic sheet.

The spacer sheet is required to have a size equal to or larger than that of the green sheet for ceramic sheet. If the spacer sheet smaller than the green sheet for ceramic sheet are used in baking a plurality of green sheets, the green sheets for baking are directly in contact with each other at the portions where no spacer is present therebetween, and as a result, they are attached to each other at these portions by baking.

In order that the green sheet for ceramic sheet slides smoothly on the spacer green sheet when it shrinks in baking, the spacer green sheet preferably has a Ra value as a surface roughness, measured by the method in accordance with JIS B-0601, of 10 µm or smaller, and more preferably 5 µm or smaller, and the most preferably 2 µm at its surface to be contact with the green sheet for ceramic sheet. Contrary to this, the surface roughness of the spacer calcined sheet is not specified because it is a porous sheet. In order that the green sheet for ceramic sheet slides smoothly on the spacer calcined sheet when it shrinks in baking, polishing may be applied to the surface of the spacer calcined sheet to be contact with the green sheet for ceramic sheet.

In the method for producing the ceramic sheet of the present invention, the green sheet for ceramic sheet is sandwiched by the separator sheets (i.e., spacers) described above, and is baked in this state. FIG. 1 is a diagram for showing a preferable embodiment of the method for producing the ceramic sheet. In FIG. 1, on a setter 1 made of ceramics, a cover 3a is placed. And on the cover 3a, green sheets for baking 2 and spacer sheets 3 are alternately stacked in layers. On the top green sheet 2, which is placed on the top of the stacked layers, a thick cover 3b serving as both a cover and a weight is placed. In this state, the plurality of green sheets 2 are baked.

Each of the covers 3a and 3b is a kind of spacer sheet (hereinafter, referred to as a cover sheet), and may be made of the same material as of the spacer sheet 3. That is, the covers 3a and 3b may be a green sheet or calcined sheet made of spherical ceramic particles in which major of them has an average particle diameter of 0.1 to less than 5 µm. As is the case of the spacer sheet, the cover sheets, 3a and 3b, are preferably calcined at a temperature of 50 to 300° C. lower than their sintering temperature. Since the cover 3a is directly placed on the setter 1 and the cover 3b is placed on the top green sheet to serve as both a cover and a weight, they are generally made to have a thickness larger than that of the spacer sheets 3.

The method of the present invention can efficiently produce a ceramic sheet having uniform quality over its entire surface with a decreased number of defects such as foreign matters and flaws, and has high mechanical strength.

Hereinafter, the present invention will be further described by way of examples. However, it is to be noted that the present invention is not limited to these examples.

EXAMPLES

[Method for Measurement and Evaluation]

The methods for measurement and evaluation were as follows.

(1) Measurement of the Position and Number of Defects of Ceramic Sheet

A ceramic sheet was placed on a table of a ceramics plate inspection machine equipped with fluorescent surface illumination, manufactured by Minolta Co., Ltd., on which a charge coupled device (CCD) camera [type: XC-7500, the number of effective pixels: 659(H)×494(V)] manufactured by Sony Corp., an image processor, a host computer and the like are mounted. The transmitted light from the surface illumination was adjusted to have an intensity on the surface of the ceramic sheet of 4500 lux.

The surface of the ceramic sheet was divided into sections each having an area of 30 mm×30 mm. The number of defects of each section was counted using the inspection machine. The surface of the ceramic sheet was divided in such a manner that the sections smaller than 30 mm square were positioned at its peripheral area. In the case of a 100 mm square ceramic sheet, it was divided into 16 sections, Aa, Ab . . . Dd, as shown in FIG. 2. In the case of a 120 mm square ceramic sheet, it was divided into 25 sections, Aa, Ab . . . Ed, Ee.

The inspection time was set about 90 seconds for detecting foreign matters, flaws, stains, outer dimensions and a size of holes, and about 90 seconds for detecting depressed portions, that is, 180 seconds in total. As to the inspection accuracy, foreign matters, flaws and stains of 0.1 mm$^2$ or larger could be detected. The outer dimensions and size of holes could be detected with a precision of ±0.1 mm. Depressed portions having a diameter of 0.2 mm or larger could be detected.

(2) Bending Strength

Four-point bending strength of ten ceramic sheets was measured in accordance with JIS R-1601. In the measurement, the surface of each ceramic sheet was divided in the same manner as the measurement of the number of defects.

Figure 3:
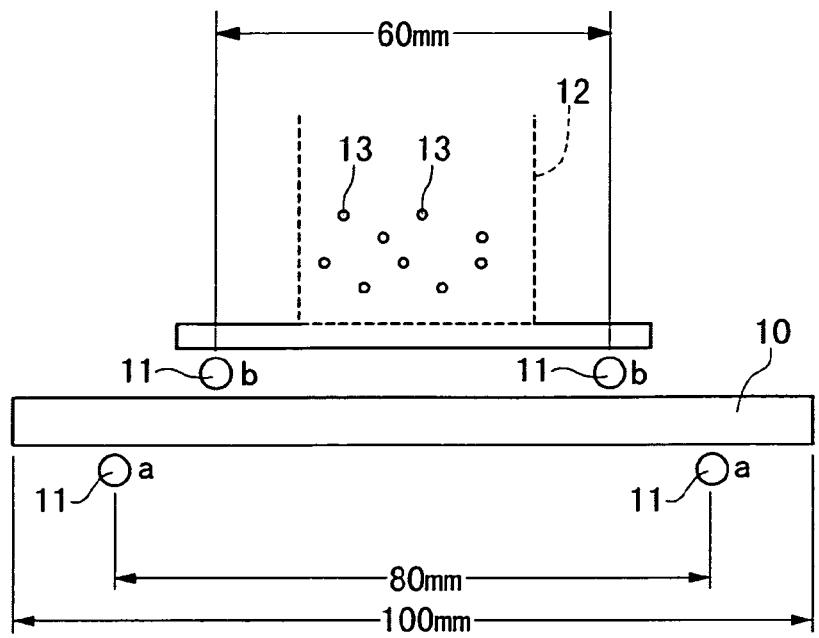
FIG. 3 is a schematic diagram showing the structure of the device for measuring bending strength of the ceramic sheet.

The measurement was conducted by the following steps. As shown in FIG. 3, a ceramic sheet 10 was fixed between two pairs of stainless steel bars 11 having a diameter of 8 mm and a length of 120 mm. The distance (a—a) between the pair of lower stainless steel bars 11 was 80 mm, and the distance (b—b) between the upper stainless steel bars 11 was 60 mm. A basket 12 was placed on the upper stainless steel bars 11. Into the basket 12, lead balls 13 having a diameter of 1 mm were put to give a uniform load to the entire ceramic sheet 10. Then, the final load, the weight of the lead balls 13 in the basket 12 which broke the ceramic sheet 10, is determined. From the final load, a bending strength thereof was calculated.

(3) Weibull Modulus

From the final load obtained in the bending strength test above, Weibull modulus was calculated defining the number of samples N as 10.

When the ceramic sheet is intended to be used as a solid electrolyte film of fuel cell which is assembled into a system, the ceramic sheet is required to have such a strength that its Weibull modulus is 10 or larger, preferably 15 or larger.

(4) Load Capacity Test

Figure 4:
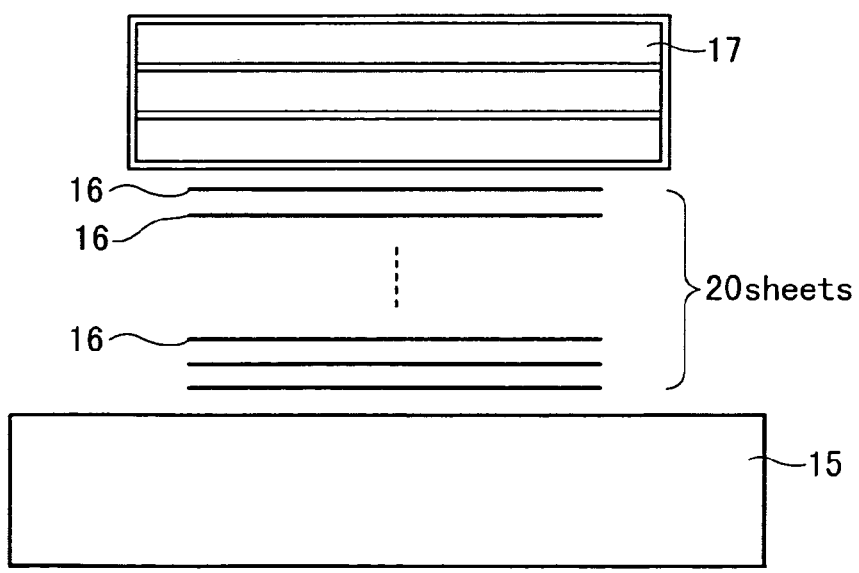
FIG. 4 is a schematic diagram showing the structure of the device for measuring load capacity of the ceramic sheet by a load test.

As shown in FIG. 4, 20 pieces of ceramic sheets 16 were stacked in layers on an alumina setter 15 in an electric furnace, and an alumina plate 17 having a weight of 5 kg was placed on the top ceramic sheet 16. In this state (that is, under a load of 50 g/cm$^2$), the ceramic sheets 16 were held at 1000° C. for 100 hours.

After 100 hours, the alumina plate 17 was removed, and 20 pieces of ceramic sheets 16 were visually observed to check whether they had cracks or not. The number of ceramic sheets having cracks was counted.

Example 1

[Production of Green Sheet for Ceramic Sheet]

An aqueous solution of zirconium oxychloride containing 14.8 mole % of yttrium chloride was dripped into an ammonia water to produce a precipitate, and the precipitate was washed and dried. The dried precipitate was baked at 1000° C. to obtain zirconia powder. The zirconia powder was measured with a laser diffraction system particle size distribution meter (SALD-1100, a product of Shimadzu Corp.). The average particle diameter of the zirconia powder was 1.5 μm, and the particle diameter at 90 vol % thereof was 3 μm.

Pure water was added to the zirconia powder to prepare a powder-dispersed liquid of 20 wt %. The liquid was ground with a bead mill for 2 hours, and then was dried at 50° C. under reduced pressure. As a result, obtained was zirconia powder stabilized by 8 mol % of yttria having an average particle diameter of 0.22 μm and a particle diameter of 0.8 μm at 90 vol %.

To 100 parts by weight of the stabilized zirconia powder obtained by grinding, added were 15 parts by weight of acrylic binder as a solid content, 40 parts by weight of toluene/ethyl acetate (weight ratio: 2/1) as a solvent and 2 parts by weight of dibutyl phthalate as a plasticizer, to prepare a mixture, wherein the acrylic binder had the monomer composition of 79.5 wt % of isobutyl methacrylate, 20 wt % of 2-ethyl hexyl methacrylate and 0.5 wt % of methacrylic acid. The mixture was kneaded with a ball mill, and was degassed and adjusted in viscosity to give a slurry of having a viscosity of 30 poize. The slurry was formed into the shape of a sheet by a doctor blade process, to produce a zirconia green sheet having a thickness of 0.25 mm.

[Preparation of Spherical Alumina Particles]

30 moles of aluminum nitrate was dissolved into 170 liter of pure water, and then 30 moles of urea and 1.5 moles of acetic acid were added thereto. The resulting solution was hydrolyzed by boiling while being circulated and stirred for 3 hours, to obtain a transparent alumina sol. The alumina sol was left for 24 hours, and was introduced into an ultrafilter to wash the alumina sol. The washed alumina sol has a concentration of 8 wt %.

10 g of a surfactant composed of polyoxyethylene sorbitan fatty acid ester was added and dissolved into 1 liter of toluene. 0.8 liter of the 8 wt % alumina sol was added to the resulting solution with the solution vigorously stirred with a homogenizer, and then the solution was further stirred for about 1 hour to produce a W/O type sol emulsion. While the W/O emulsion was stirred, 100% ammonia gas was introduced thereto at a flow rate of 20 ml/min for about 2 hours to be gelled the sol emulsion. The gelled emulsion was heated and boiled to remove water, and after removing the water, the emulsion was dried to remove toluene. The obtained spherical particles were baked at 400° C. for 2 hours to obtain alumina spherical particles having an average particle diameter of 0.8 μm. Since the alumina particles had excellent dispersibility, it easily re-dispersed into primary particles by grinding them with a mortar, or by mixing them with such a dispersion medium as water followed by exposing the mixture to supersonic waves. The primary alumina particles were observed with a transmitting type electronic microscope. It was found that all of them were spherical and the value of W (major axis/minor axis) was in the range of 1.2 to 1.8. The average particle diameter of the spherical alumina particles was 0.8 μm.

[Spacer Sheet]

A spacer green sheet was produced by the following steps using spherical alumina particles having an average particle diameter of 0.7 μm.

To 100 parts by weight of spherical alumina particles, added were 14 parts by weight of acrylic binder as a solid content, 40 parts by weight of toluene/ethyl acetate (weight ratio: 2/1) as a solvent and 2.5 parts by weight of dibutyl phthalate as a plasticizer, to prepare a mixture, wherein the acrylic binder was of the same type as that used for producing the green sheet for ceramic sheet. The mixture was kneaded, degassed and adjusted in viscosity, to obtain a slurry having a viscosity of 25 poise. The slurry was formed into a sheet by a doctor blade process to obtain a spacer green sheet having a thickness of 0.15 mm.

[Cover Sheet]

A cover green sheet was sheet prepared in the same manner as the spacer green sheet, except that the cover green sheet had a thickness of 0.2 mm.

[Production of Ceramic Sheet]

On a setter, the spacer sheet and a green sheet for ceramic sheet cut into a predetermined shape were placed in order. A cover sheet was placed on the green sheet for ceramic sheet. In this state, the green sheet for ceramic sheet was baked at 1450° C., to produce a zirconia sheet stabilized by 8 mole % of yttria. The stabilized zirconia sheet had a side of 100 mm and a thickness of 0.2 mm.

The spacer sheet and the cover sheet were calcined into porous sheets having a porosity of 30% by the baking of the green sheets for ceramic sheet.

Example 2

[Green Sheet for Ceramic Sheet]

An aqueous solution of zirconium oxychloride containing 5.8 mole % of yttrium chloride was dripped into an ammonia water to produce a precipitate, and the precipitate was washed and dried. The dried precipitate was baked at 1000° C. to obtain zirconia powder. Pure water was added to the zirconia powder to prepare a 20 wt % of powder-dispersed liquid. The liquid was grinded with a bead mill for 2 hours, and then was dried at 50° C. under reduced pressure. As a result, obtained was zirconia powder stabilized by 3 mole % of yttria having an average particle diameter of 0.51 μm and a particle diameter of 1.28 μm at 90 vol %.

By repeating the steps of Example 1, a green sheet for ceramic sheet having a thickness of 0.13 mm was produced using the zirconia powder.

[Spacer Sheet and Cover Sheet]

As a spacer sheet and cover sheet, a green sheet produced by repeating the steps of Example 1 was baked at 1500° C. to produce a calcined sheet having a porosity of 25%. The obtained spacer calcined sheet and cover calcined sheet had thicknesses of 0.13 mm and 0.27 mm, respectively.

[Production of Ceramic Sheet]

On the cover sheet, a green sheet for ceramic sheet cut into a predetermined shape and the spacer sheet were placed in order. On the spacer sheet, another green sheet for ceramic sheet, another spacer sheet and still another green sheet for ceramic sheet were stacked in this order, and another cover sheet was placed thereon. In this state, the green sheets for ceramic sheet were baked at 1450° C., to obtain zirconia sheets stabilized by 3 mole % of yttria. Each of the obtained zirconia sheet had a thickness of 0.1 mm.

Example 3

[Green Sheet for Ceramic Sheet]

The zirconia powder stabilized by 3 mole % of yttria obtained in Example 2 was mixed with alumina powder of 0.5 wt % (AL-160-SG-3, a product of Showa Denko Co., Ltd.) with respect to the zirconia powder to prepare a zirconia-alumina mixed powder. By repeating the steps of Example 1, a green sheet for ceramic sheet was produced using the zirconia-alumina mixed powder. The green sheet had a thickness of 0.07 mm.

[Spacer Sheet and Cover Sheet]

As a spacer sheet and cover sheet, a green sheet was produced by repeating the steps of Example 2, except for using mixed powder of the spherical alumina particles manufactured by Nippon Shokubai Co., Ltd. (an average particle diameter: 0.8 μm) and the zirconia stabilized by yttria of 3 mole % prepared in Example 2 (an average particle diameter: 0.51 μm). The mixing ratio of the spherical alumina particles to the zirconia was 9:1 (alumina: zirconia). The green sheet was baked at 1500° C. to obtain a calcined sheet. The obtained spacer calcined sheet and cover calcined sheet respectively had thicknesses as shown in Table 1.

[Production of Ceramic Sheet]

As was conducted in Example 2, on the cover sheet produced above, the cut green sheet for ceramic sheet having a predetermined shape and the spacer sheet were placed in order. On the spacer sheet, another green sheet for ceramic sheet, another spacer sheet and still another green sheet for ceramic sheet were stacked in this order, and another cover sheet was placed thereon. In this state, the green sheets for baking were baked at 1450° C. As a result, zirconia sheets stabilized by 3 mole % of yttria having 0.5 wt % of alumina was obtained. The zirconia sheets respectively had sizes as shown in Table 1.

Comparative Example 1

A green sheet for ceramic sheet was produced by repeating the steps of Example 1.

Then, spacer green sheets and a cover sheet were produced by repeating the steps of Example 1, using alumina powder (AL-15-2, a product of Showa Denko Co., Ltd.) having an average particle diameter of 55 μm. The spacer green sheet had a thickness of 0.15 mm, and the cover green sheet had a thickness of 0.2 mm. The alumina powder had no definite form.

By repeating the steps of Example 1, the green sheet for ceramic sheet was baked, except for using the spacer green sheet and the cover green sheet obtained above. As a result, a zirconia sheet stabilized by 8 mole % of yttria was obtained. The zirconia sheet had a thickness of 0.2 mm.

Comparative Example 2

A green sheet for ceramic sheet was produced by repeating the steps of Example 1, except for the amount of binder as shown in Table 1.

A spacer green sheet and a cover green sheet were respectively produced by repeating the steps of Comparative Example 1, and were cut into predetermined shapes. The cut green sheets were baked at 1500° C., to obtain calcined sheets having a porosity of 35%. The spacer calcined sheet and the cover calcined sheet respectively had thicknesses as shown in Table 1.

As was conducted in Example 2, on a setter, the cover sheet and the green sheet for ceramic sheet cut into a predetermined shape were placed in order. On the green sheet, the spacer sheet was placed. On the spacer sheet, another green sheet for ceramic sheet, another spacer sheet and still another green sheet for ceramic sheet were stacked in this order, and another cover sheet was placed thereon. In this state, the green sheets were baked at 1450° C., and as a result, zirconia sheets stabilized by 3 mole % of yttria was obtained. Each of the obtained zirconia sheets had a thickness of 0.1 mm.

TABLE 1

|  |  | Example 1 | Example 2 | Example 3 | Comparative Example 1 | Comparative Example 2 |
|---|---|---|---|---|---|---|
| Green sheet for ceramic sheet | Ceramic powder | 8Y-Zirconia | 3Y-Zirconia | 3Y-Zirconia Alumina | 8Y-Zirconia | 3Y-Zirconia |
|  | Average particle diameter (μm) | 0.22 | 0.51 | Zirconia: 0.6 (sic 0.51) Alumina: 0.8 | 0.22 | 0.22 (sic 0.51) |
|  | Particle diameter at 90 vol % (μm) | 0.8 | 1.28 | Zirconia: 1.7 (sic 1.28) Alumina: 2.9 | 0.8 | 0.8 (sic 1.28) |
|  | Binder (parts) | 15 | 15 | 14 | 15 | 14 |
|  | Thickness of green sheet (mm) | 0.25 | 0.13 | 0.07 | 0.25 | 0.25 (sic 0.13) |
|  | Size after baking (mm) One side × thickness | 100 × 0.2 | 100 × 0.1 | 120 × 0.05 | 100 × 0.2 | 100 × 0.1 |
| Spacer sheet-cover sheet | Kind of sheet (rate of porosity) | Green sheet | Calcined sheet (25%) | Calcined sheet (22%) | Green sheet | Calcined sheet (35%) |
|  | Ceramic powder | Spherical alumina of Nippon Shokubai Co., Ltd. | Spherical alumina of Nippon Shokubai Co., Ltd. | Spherical alumina of Nippon Shokubai Co., Ltd. (90%) 3Y-Zirconia (10%) | No definite form alumina of Showa Denko Co., Ltd. | No definite form alumina of Showa Denko Co., Ltd. |
|  | Average particle diameter (μm) | 0.7 | 0.7 | Alumina: 0.8 Zirconia: 0.51 | 55 | 0.7 (sic 0.55) |
|  | Thickness of spacer sheet (mm) | 0.15 | 0.13 | 0.15 | 0.15 | 0.13 |
|  | Thickness of cover sheet (mm) | 0.2 | 0.27 | 0.3 | 0.2 | 0.27 |

[Evaluation]

The number of defects, bending strength and Weibull modulus of the zirconia sheets obtained in Examples 1 to 3 and Comparative Examples 1 and 2, and number of the zirconia sheets having cracks and checks in those Examples and Comparative Examples were measured and evaluated by the methods described above. The number of defects of the respective zirconia sheets are shown in Table 2. The results of the other measurements are shown in Table 3.

In counting the number of defects, ceramic sheets were divided into 25 sections in Example 3, while those in Examples 1 and 2 and Comparative Examples 1 and 2 were divided into 16 sections.

TABLE 2

| Section | Example 1 | Example 2 | Example 3 | Comparative Example 1 | Comparative Example 2 |
|---|---|---|---|---|---|
| Aa | 2 | 0 | 0 | 5 | 2 |
| Ab | 0 | 2 | 3 | 2 | 4 |
| Ac | 1 | 0 | 0 | 1 | 7 |
| Ad | 1 | 1 | 0 | 1 | 2 |
| Ae | — | — | 0 | — | — |
| Ba | 3 | 1 | 1 | 2 | 0 |
| Bb | 0 | 0 | 0 | 0 | 2 |
| Bc | 1 | 0 | 0 | 1 | 1 |
| Bd | 3 | 2 | 1 | 7 | 0 |
| Be | — | — | 0 | — | — |
| Ca | 2 | 0 | 0 | 1 | 4 |
| Cb | 1 | 1 | 0 | 0 | 6 |
| Cc | 0 | 0 | 0 | 3 | 2 |
| Cd | 2 | 1 | 0 | 6 | 1 |
| Ce | — | — | 2 | — | — |
| Da | 1 | 0 | 1 | 6 | 0 |
| Db | 1 | 1 | 3 | 0 | 0 |
| Dc | 2 | 2 | 0 | 8 | 9 |
| Dd | 3 | 3 | 1 | 3 | 7 |
| De | — | — | 0 | — | — |
| Ea | — | — | 0 | — | — |
| Eb | — | — | 1 | — | — |
| Ec | — | — | 1 | — | — |
| Ed | — | — | 0 | — | — |
| Ee | — | — | 0 | — | — |

As seen in Table 2, all the sections of ceramic sheets of Examples 1 to 3 had 5 or less defects. Contrary to this results, some sections of the ceramic sheets of Comparative Examples 1 and 2 had 5 or more defects.

TABLE 3

|  | Example 1 | Example 2 | Example 3 | Comparative Example 1 | Comparative Example 2 |
|---|---|---|---|---|---|
| Number of sections having 5 or more defects | 0 | 0 | 0 | 4 | 3 |
| Bending strength (kgf/mm$^2$) | 24 | 69 | 84 | 18 | 55 |
| Weibull modulus | 13 | 15 | 11 | 8 | 7 |
| Numbers of sheets having checks and cracks (pieces) | 3 | 1 | 2 | 7 | 6 |

As seen in Table 3, the ceramic sheets of Examples 1 to 3 had larger bending strength and Weibull modulus than those of Comparative Examples 1 and 2, while having less cracks and checks. From this result, it was found that the ceramic sheets of Examples 1 to 3 had higher strength and uniformity than those of Comparative Examples 1 and 2. In addition, from the result of Example 3, it was found that the number of defects in each section was suppressed to 5 or less by using a spacer sheet and a cover sheet composed of spherical ceramic particles as a main component.

The invention claimed is:

1. A method for producing a ceramic sheet, the method comprising steps of:

sandwiching a first green sheet between spacers;

baking the first green sheet while the first green sheet is sandwiched between the spacers; and producing a ceramic sheet having not more than 5 defects in an area of 900 mm$^2$ from the first green sheet, wherein prior to the baking each of the spacers is a calcined sheet comprising spherical ceramic particles having an average particle diameter of 0.1 to less than 5 μm as a main component; and the calcined sheet is obtained by calcining a second green sheet at a temperature that is 50 to 300° C. lower than a sintering temperature of the second green sheet.

2. The method according to claim 1, wherein the content of the spherical ceramic particles is 80 wt % or larger with respect to the weight of the total ceramics contained in each of the spacers.

3. The method according to claims 1 or 2, wherein the spacers comprise the calcined sheet; and the calcined sheet includes ceramic particles 80 wt % or more of which are spherical ceramic particles having an average particle diameter of 0.1 to less than 5 μm.

4. The method according to claim 3, wherein the spherical ceramic particles have a ratio of a major axis thereof relative to a minor axis thereof of 1 to 3.

5. A method for producing a ceramic sheet, the method comprising steps of:

sandwiching a first green sheet between spacers;

baking the first green sheet while the first green sheet is sandwiched between the spacers; and producing a ceramic sheet having not more than 5 defects in an area of 900 mm$^2$ from the first green sheet, wherein each of the spacers is either a second green sheet or a calcined sheet each comprising spherical ceramic particles having an average particle diameter of 0.1 to less than 5 μm as a main component, and each of the spacers has a sintering temperature 50 to 300° C. higher than the sintering temperature of the first green sheet.

* * * * *